US009053718B1

United States Patent
Adrong et al.

(10) Patent No.: US 9,053,718 B1
(45) Date of Patent: Jun. 9, 2015

(54) METHOD FOR MANUFACTURING A MAGNETIC TAPE HEAD USING AN INK MASK FORMED BY PRINTING

(71) Applicant: HGST Netherlands B.V., Amsterdam (NL)

(72) Inventors: Que Adrong, San Jose, CA (US);
Cherngye Hwang, San Jose, CA (US);
Dung T. Nguyen, San Jose, CA (US);
Eduardo Torres Mireles, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/086,923

(22) Filed: Nov. 21, 2013

(51) Int. Cl.
*G11B 5/33* (2006.01)
*G11B 5/40* (2006.01)

(52) U.S. Cl.
CPC ... *G11B 5/33* (2013.01); *G11B 5/40* (2013.01)

(58) Field of Classification Search
USPC .......................................................... 360/121
See application file for complete search history.

(56) References Cited

U.S. PATENT DOCUMENTS

| | | | |
|---|---|---|---|
| 5,394,285 A * | 2/1995 | Dee et al. ....................... | 360/121 |
| 6,122,147 A * | 9/2000 | Fahimi et al. .................. | 360/221 |
| 6,879,470 B2 | 4/2005 | Johnson et al. | |
| 7,170,721 B2 | 1/2007 | Wu | |
| 7,403,359 B1 | 7/2008 | Nibarger et al. | |
| 7,477,482 B2 * | 1/2009 | Biskeborn et al. ............ | 360/121 |
| 7,567,409 B2 * | 7/2009 | Lee et al. .................... | 360/241.1 |
| 7,570,457 B2 * | 8/2009 | Biskeborn ...................... | 360/122 |
| 7,656,602 B2 | 2/2010 | Iben et al. | |
| 7,760,465 B2 * | 7/2010 | Koeppe ........................ | 360/121 |
| 7,827,674 B2 | 11/2010 | Nibarger et al. | |
| 7,883,607 B2 * | 2/2011 | Biskeborn et al. ....... | 204/192.32 |
| 8,318,242 B2 | 11/2012 | Bradshaw et al. | |
| 8,611,043 B2 * | 12/2013 | Biskeborn et al. ............ | 360/110 |
| 8,611,049 B2 * | 12/2013 | Biskeborn et al. ............ | 360/231 |
| 2008/0266711 A1 | 10/2008 | Nibarger et al. | |
| 2012/0262818 A1 | 10/2012 | Biskeborn et al. | |
| 2012/0307397 A1 | 12/2012 | Biskeborn et al. | |

OTHER PUBLICATIONS

Tetsukawa, H., "Spin-Valve Head With Corrosion Resistance for Tape Recording System," IEEE Transactions on Magnetics, vol. 40, No. 6, Nov. 2004, pp. 3541-3544.
Bhushan, B. "Development of Hard Carbon Coatings for Thin-Film Tape Heads," IEEE Transactions on Magnetics, vol. 31, No. 6, Nov. 1995, pp. 2976-2978.

* cited by examiner

*Primary Examiner* — Mark Blouin
(74) *Attorney, Agent, or Firm* — Zilka-Kotab, PC

(57) ABSTRACT

A method for forming a protective overcoat onto a tape bearing surface of a tape head used for magnetic tape recording. In order to ensure optimal surface tension and liftoff properties of the ink mask, the tape bearing surface is treated with a first application of ethanol, followed by an application of polydimethylsiloxane, followed by a second application of ethanol. After this treatment an ink mask can be printed onto the tape bearing surface so as to form a mask having an opening over the location of the magnetic transducer. An etching can then be performed followed by the deposition of a protective coating such as alumina.

10 Claims, 10 Drawing Sheets

METHOD FOR MANUFACTURING A MAGNETIC TAPE HEAD USING AN INK MASK FORMED BY PRINTING

FIELD OF THE INVENTION

The present invention relates to magnetic data recording and more particularly to a method for manufacturing a magnetic tape head using ink printing to pattern an overcoat with high resolution.

BACKGROUND OF THE INVENTION

In magnetic storage systems, data is read from and written onto magnetic recording media utilizing magnetic transducers. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has lead to increasing the track density on a recording tape, and decreasing the thickness of the magnetic tape medium. However, the development of small footprint, higher performance tape drive systems has created various problems in the design of a tape head assembly for use in such systems.

In a tape drive system, magnetic tape is moved over the surface of the tape head at high speed. Usually the tape head is designed to minimize the spacing between the head and the tape. The spacing between the magnetic head and the magnetic tape is crucial to minimizing the signal amplitude decrease resulting from Wallace spacing losses, which increases with increased magnetic recording flux densities. Thus the tape bearing surface (TBS) is in contact with the tape so that the read element is in near contact with the tape to provide effective coupling of the magnetic field from the tape to the read element. The Wallace spacing is, among other factors, due to asperities on the tape and to erosion of the sensor due to wear. Build up of non-magnetic material between the sensor and the tape magnetic coating can also cause Wallace spacing. Corrosion or oxidation initiated at the TBS of the sensor or the protective poles surrounding the sensor can also lead to increased Wallace spacing losses.

Further, the AMR, GMR, TMR, etc. sensors usable in tape heads all have a propensity for corrosion. Corrosion or oxidation of the sensor at the TBS can result in surface oxidation of the sensor metals which results in an increase in the spacing between the magnetically active portion of the sensor and the magnetic coating on the tape. High level corrosion can completely destroy the magnetic response of the sensor. One proposed solution is to recess the sensor and apply a hard protective overcoat, such as alumina. However, such materials are in contact with the tape, and tend to wear away, thereby leaving the sensor unprotected. The available methods of depositing the hard protective coatings require large expensive tools which preclude the reapplication of a hard coating once it has been worn off. Furthermore, such recession results in Wallace spacing signal losses, which are exacerbated at higher data density.

Currently, overcoat deposition processes do not include any masking process so the protective overcoat covers the entire tape bearing surface. This leads to an increase in spacing between the magnetic transducer and the tape, resulting in increased Wallace spacing and decreased performance.

SUMMARY OF THE INVENTION

The present invention provides an apparatus for magnetic data recording that includes a row bar having a tape bearing surface and having a magnetic transducer formed therein. A protective coating is formed over the magnetic transducer.

A recess can be formed in the tape bearing surface at the location of the magnetic transducer, and the protective coating (which may be alumina) can be self aligned with the recess so that it is only located in the recess and over the transducer and leaves the remainder of the tape bearing surface uncovered. In this way, the magnetic transducer can be protected from wear and corrosion without increasing magnetic spacing, which would negatively impact magnetic performance.

The apparatus can be formed by a process that includes forming a row bar having a tape bearing surface and having a magnetic transducer formed therein, and applying a first application of ethanol to the tape bearing surface. Polydimethylsiloxane can then be applied to the tape bearing surface, followed by a second application of ethanol to the tape bearing surface. An ink mask is then printed onto the tape bearing surface.

The above treatment of the tape bearing surface prior to printing of the ink mask provides an optimal surface tension that allows the mask to be well defined by printing, but which also allows the ink mask to be removed. The ink mask can be formed with an opening at a location of the magnetic transducer. After forming the mask, an etching can be performed followed by deposition of a protective coating such as alumina. The ink mask can then be removed leaving the protective coating only over the recessed region that includes the magnetic transducer, leaving the remainder of the tape bearing surface uncovered. This, therefore, allows the magnetic sensor to be protected from damage and corrosion without increasing magnetic spacing, which would negatively impact performance.

These and other features and advantages of the invention will be apparent upon reading of the following detailed description of preferred embodiments taken in conjunction with the figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
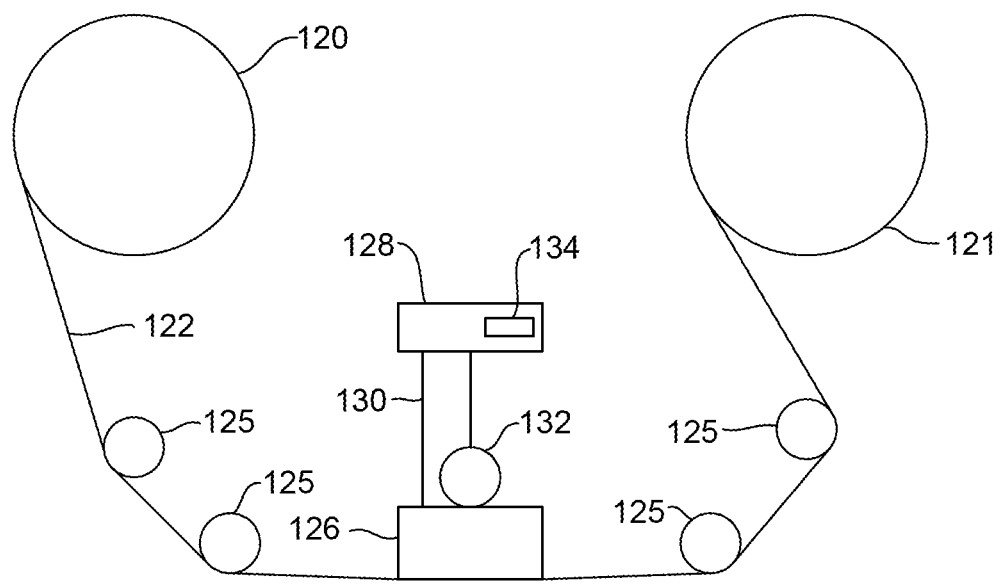
FIG. 1 is a schematic illustration of a magnetic tape drive system.

FIG. 1 is a schematic illustration of a tape drive 100 of a tape-based storage system. While one specific implementation of a tape drive is shown in FIG. 1, it should be noted that the embodiments describe herein may be implemented in the context of any type of tape drive system.

As shown, a tape supply cartridge 120 and a take-up reel 121 are provided to support a tape 122. One or more of the reels 121 may form a part of a removable cartridge and are not necessarily part of the system 100. The tape drive, such as that illustrated in FIG. 1, may further include drive motor(s) (not shown) to drive the tape supply cartridge 120 and the take-up reel 121 to move the tape 122 over a tape head 126 of any type. Such head may include an array of read transducers, write transducers, or both (not shown in FIG. 1).

Guides 125 guide the tape 122 across the tape head assembly 128 via a cable 130. The controller 128 typically controls head functions such as servo following, writing, reading, etc. The controller may operate under logic known in the art, as well as any logic disclosed herein. The cable 130 may include read/write circuits to transmit data to the head 126 to be recorded on the tape 122 and to receive data read by the head 126 from the tape 122. An actuator 132 controls the position of the head 126 relative to the tape 122.

An interface 134 may also be provided for communication between the tape drive and the host (integral or external) to send and receive the data and for controlling the operation of the tape drive and communicating the status of the tape drive to the host, as will be understood by those of skill in the art.

Figure 2:
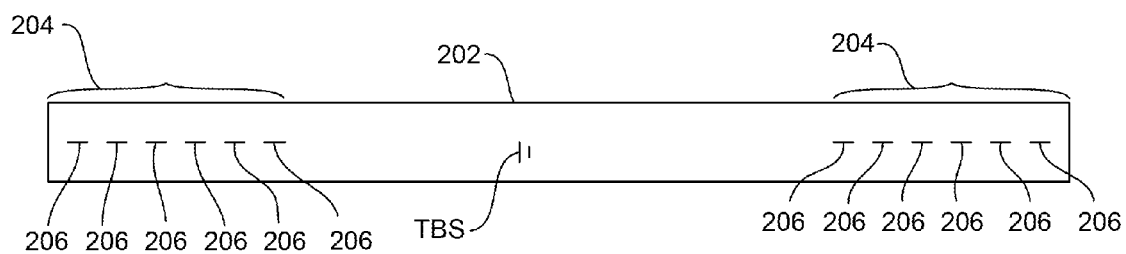
FIG. 2 is an illustration of a row bar containing modules that with a plurality of magnetic heads.
Figure 3:
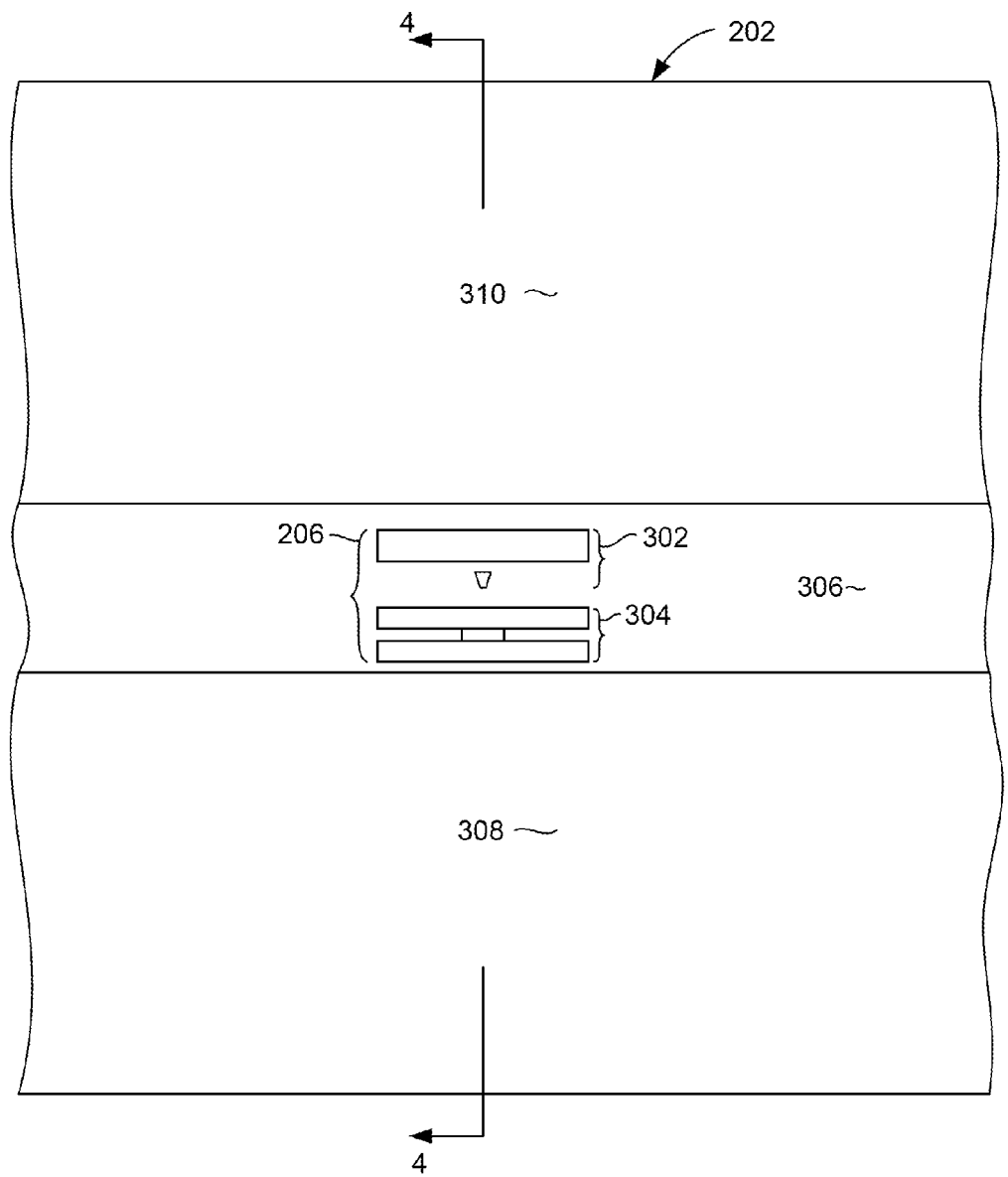
FIG. 3 is an enlarged air bearing surface view of a portion of a module containing a magnetic head.

FIG. 2 shows a row bar 202 as seen from the tape bearing surface TBS. The row bar 202 includes two modules 204, each of which includes a plurality of magnetic heads (i.e. transducers) 206. FIG. 3 is an enlarged view of a portion of a module 204 showing a single magnetic head 206. As can be seen, the magnetic head 206 actually includes a magnetic write element 302 and a magnetic read element 304. The magnetic head 206 can be encased within a non-magnetic dielectric layer 306. The magnetic head 206 and dielectric layer 306 are formed on a substrate 308 that can be formed of AlTiC. A closure structure 310 is formed over the magnetic head 206 and dielectric layer 306 such that the magnetic head 206 and dielectric layer 306 are sandwiched between the substrate 308 and closure structure 310. Like the substrate 308, the closure structure can be formed of AlTiC.

Figure 4:
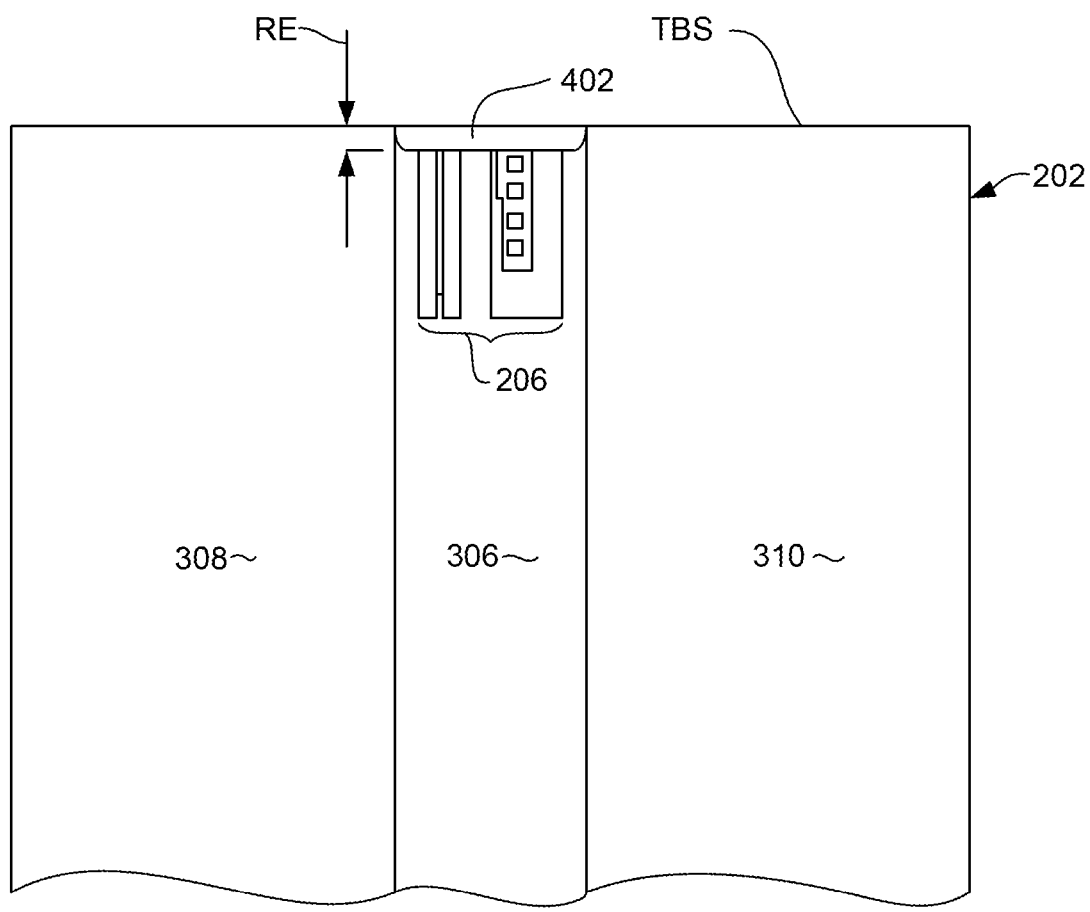
FIG. 4 shows a side cross sectional view of the module of FIG. 3 as seen from line 4-4 of FIG. 3.

FIG. 4 shows a side cross sectional view of the row bar 202 of FIG. 3. As can be seen in FIG. 4, the magnetic head 206 is recessed from the tape bearing surface TBS by a distance RE. A protective coating 402 protects the head 206 from exposure at the tape bearing surface TBS. The protective coating 402 can be constructed of a material such as alumina ($Al_2O_3$). The protective coating 402 prevents corrosion of the head 206, but also protects the head 206 from physical wear or damage that might result from contact with the magnetic recording medium (e.g. tape). It can also be seen that the protective coating 402 is only present at the location of the head 206 and is all or primarily located within the recessed region RE. The protective coating 402 is not located in other areas of the tape bearing surface TBS. This is very advantageous in that the protective coating does not increase the spacing between the tape bearing surface TBS and the media and, therefore, does not increase the magnetic spacing. Improved magnetic performance can therefore be realized by reduced magnetic spacing (Wallace spacing) while still protecting the magnetic head 206. A practical, cost effective method for manufacturing a magnetic head having such a protective structure 402 is discussed below.

Figure 5:
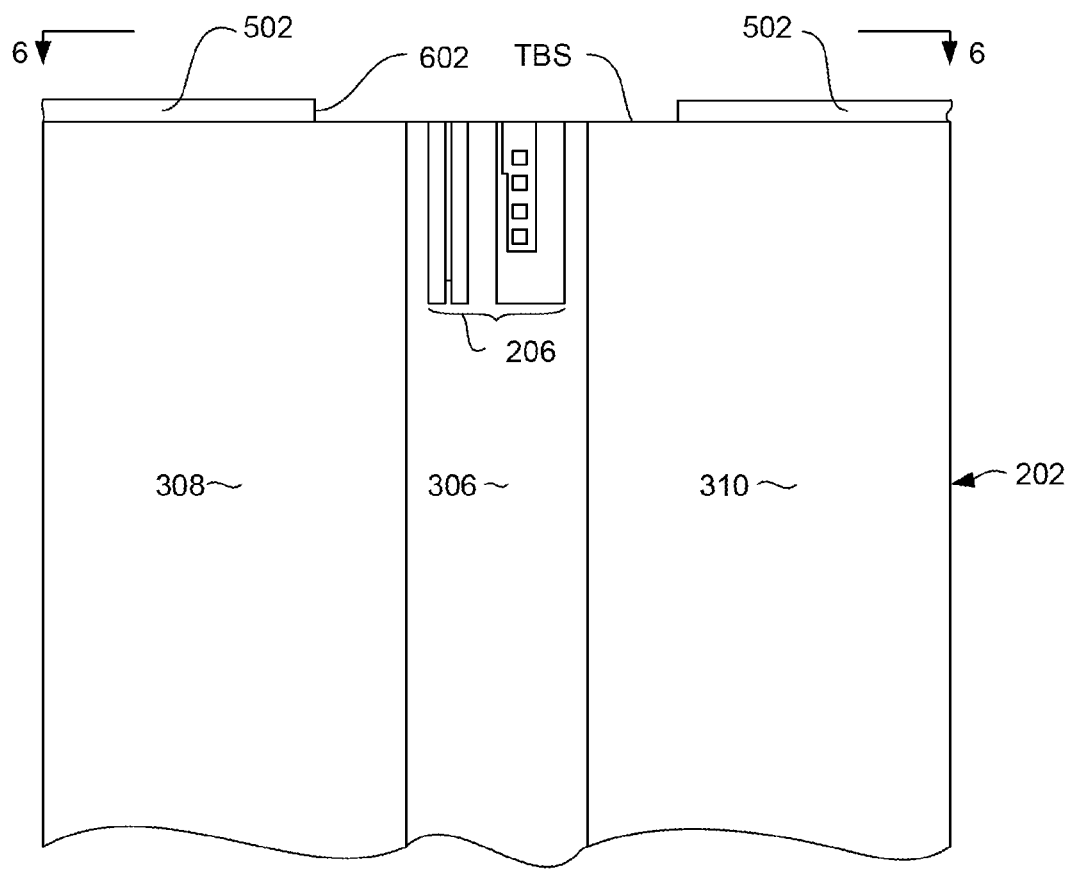
FIGS. 5-9 are views of a portion of a module of a row bar shown in various intermediate stages of manufacture in order to illustrate a method of manufacturing a magnetic tape head.
Figure 6:
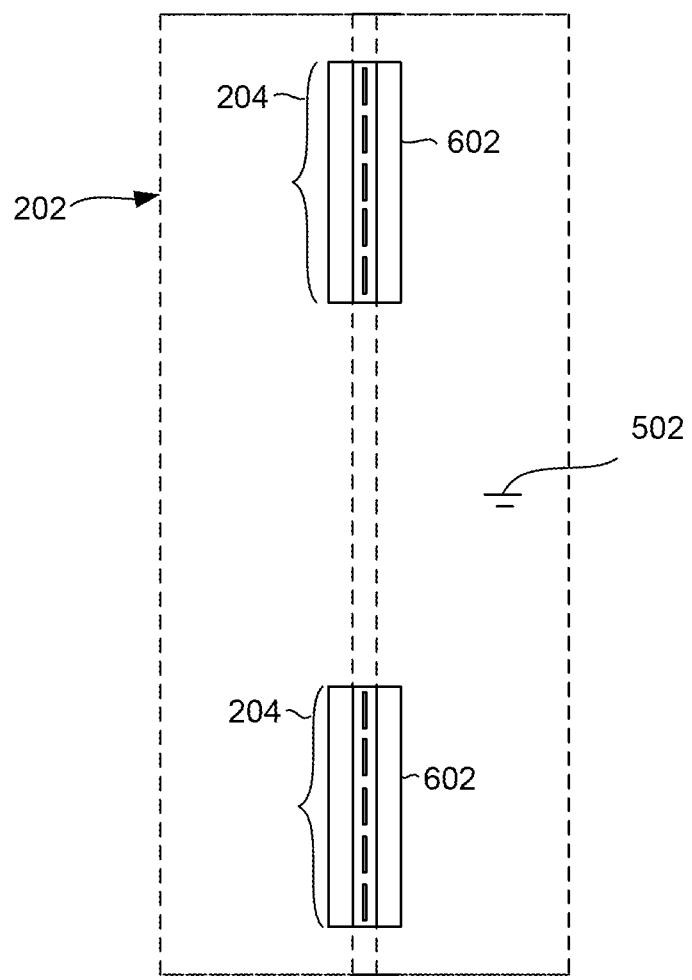

FIGS. 5-9 show a portion of a row bar in various intermediate stages of manufacture in order to illustrate a method of manufacturing a magnetic head 206 and row bar 202 having the novel protective structure 402 discussed above with reference to FIG. 4. With particular reference to FIGS. 5 and 6, a row bar 202 is formed, having a read head 206 and dielectric layer 306 sandwiched between a substrate 308 and closure 310. The row bar 202 can be formed by methods familiar to those skilled in the art. This may include providing the AlTiC substrate 308 formed as a wafer. The magnetic head 206 and dielectric layer 306 can be formed over the substrate by processes that can include various deposition processes such as sputter deposition, electroplating and ion beam deposition and also can include photolithographic patterning and ion milling processes to form the various structures of the read and write elements of the magnetic head 306. Then, the closure structure 310 can be formed over the magnetic head 206 and dielectric layer 306. These various structures 308, 306, 206, 310 can be formed on a wafer (not shown), with many such structures being formed on a single wafer. The wafer can then be sliced into individual row bars 202 and a lapping operation can be performed to define a smooth planar tape bearing surface TBS.

With the tape bearing surface TBS formed, a printing process is performed to pattern an ink mask 502 over the tape bearing surface TBS. The mask 502 is formed with an opening 602 located at the location of the magnetic head 206, but leaving most or all of the rest of the tape bearing surface TBS covered with mask material 502. The formation of the mask is formed by a novel printing process that provides an optimal balance between proper adhesion and accurate definition of the mask material and easy removal of the mask after processing. The process also allows for excellent definition of the mask opening as will be seen.

Before depositing the ink mask material 502, the tape bearing surface is treated with ethanol. Then, after this first ethanol treatment, the tape bearing surface TBS is treated with polydimethylsiloxane commonly sold under the tradename RAINE-X®. After applying the polydimethylsiloxane, it is allowed to dry. The drying can be performed for 1 minute (for example) after which the tape bearing surface will have a slight haze due to the remaining the siloxane dried out on the surface. Applying this solution to the surface provides a very low surface tension that prevents ink from overflowing to adjacent areas. However, it can also cause the ink to bead up at the edges of the mask 502, making optimal mask definition unachievable. In order to prevent this, after applying the polydimethylsiloxane the tape bearing surface TBS is treated a second time with ethanol, such as by wiping with a linen free cloth wetted with ethanol. The application of these materials (first ethanol, followed by polydimethylsiloxane and then a second application of ethanol) provides an optimal surface tension balance between the ink 502 and the tape bearing surface TBS. This results in a nearly 100% bitmap dimension of the mask 502 on the tape bearing surface TBS.

After treating the tape bearing surface as discussed above, the mask 502 can be printed onto the tape bearing surface. This can be performed using a printer such as a DIMATRIX® printer. In one possible embodiment, the printing can be done using a DIMATRIX® printer using the following parameters: cartridge drop size of 1 pL; vacuum plate temperature of 55 degrees C.; 4 jet nozzles; 20 second delay between layers; and cartridge angle of 6.8. The number of print passes can vary depending upon the desired thickness of the mask 502. For a 4 nm thick ink mask 502, 8 passes can be used.

FIG. 6 shows a top down view as seen from line 6-6 of FIG. 5 and shows how the mask has an opening 602 located over each module 204, while leaving other areas of the row bar 202 covered. Structures hidden beneath the ink mask are shown in dashed line in FIG. 6.

Figure 7:
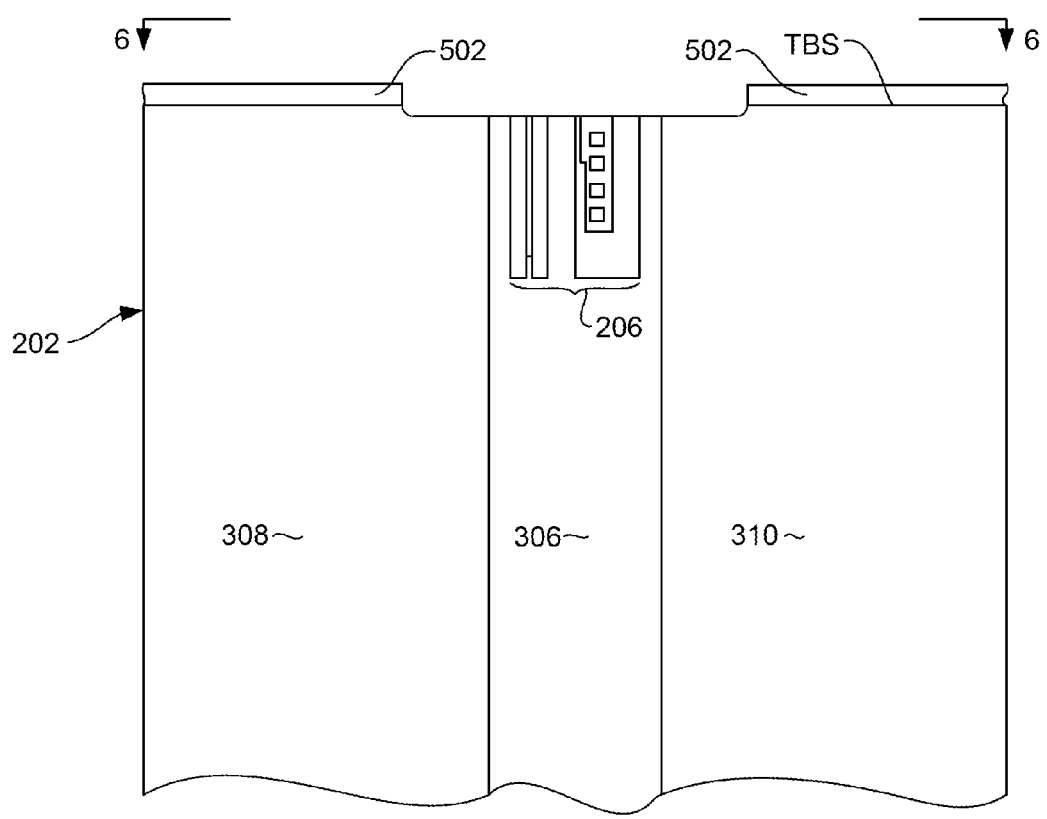
Figure 8:
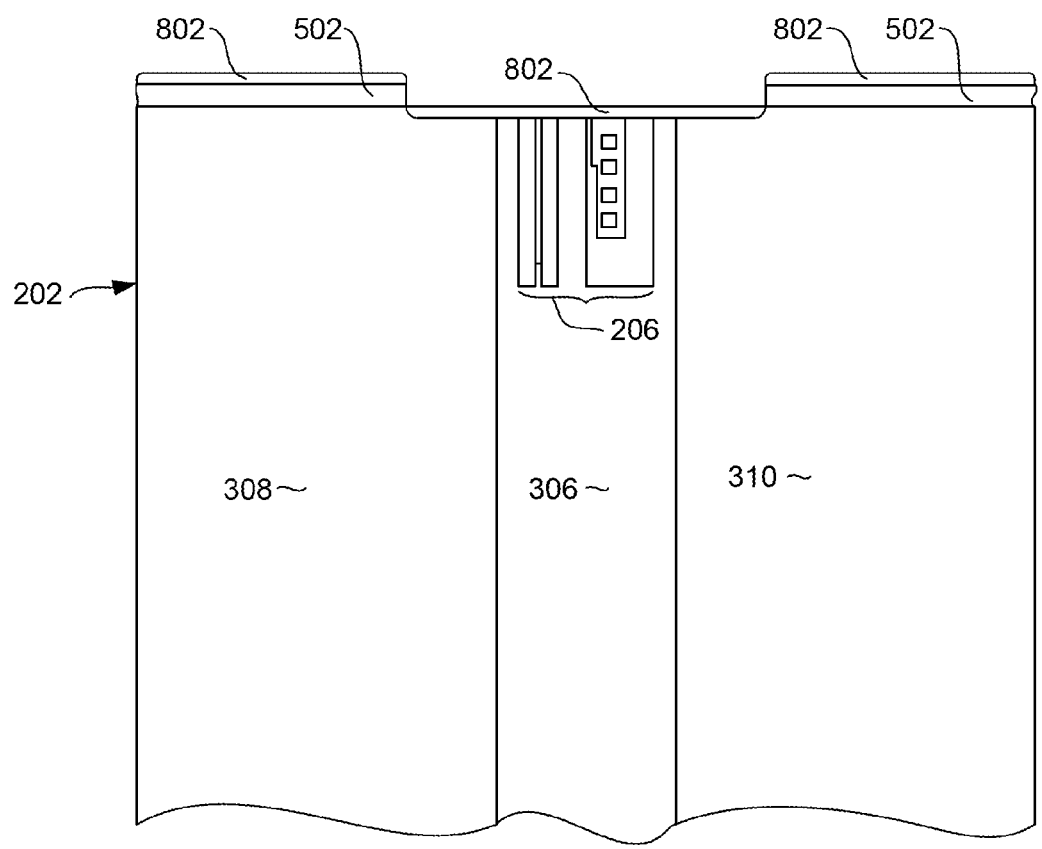
Figure 9:
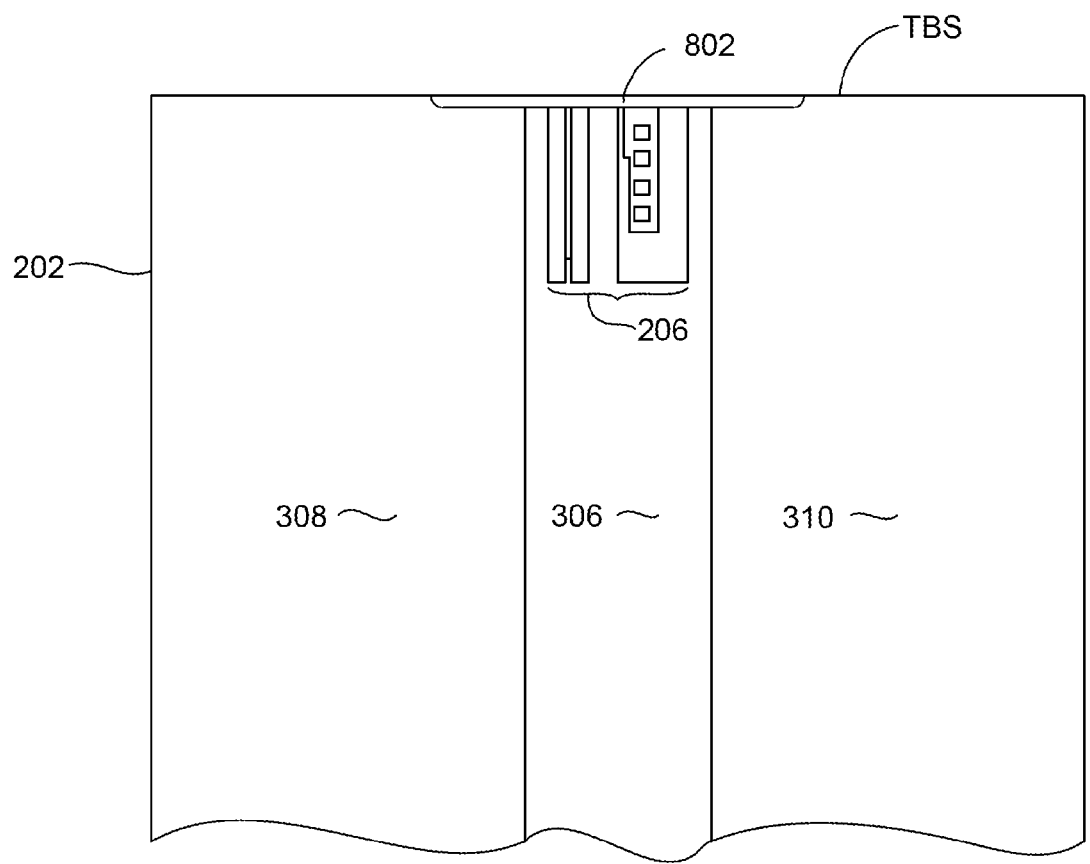

With reference now to FIG. 7, an etching process is performed to recess structures not protected by the ink mask 502. This causes the magnetic head 206 to be recessed from the tape bearing surface TBS by an amount designated RE. Then, with reference to FIG. 8 a protective overcoat layer 802 is deposited. The protective overcoat 802 is preferably alumina ($Al_2O_3$) and can be deposited by sputter deposition, atomic layer deposition or chemical vapor deposition. After the protective layer has been deposited, the ink mask 502 can be lifted off, leaving a structure as shown in FIG. 9, with the protective coating 802 only at the location of the magnetic head 206. Also, as can be seen in FIG. 9 the above process results in the protective coating only being applied within the recessed region. This, therefore, provides protection for the magnetic head 206, while not increasing the magnetic spacing such as by a protective layer otherwise being coated on the remainder of the tape bearing surface.

Figure 10:
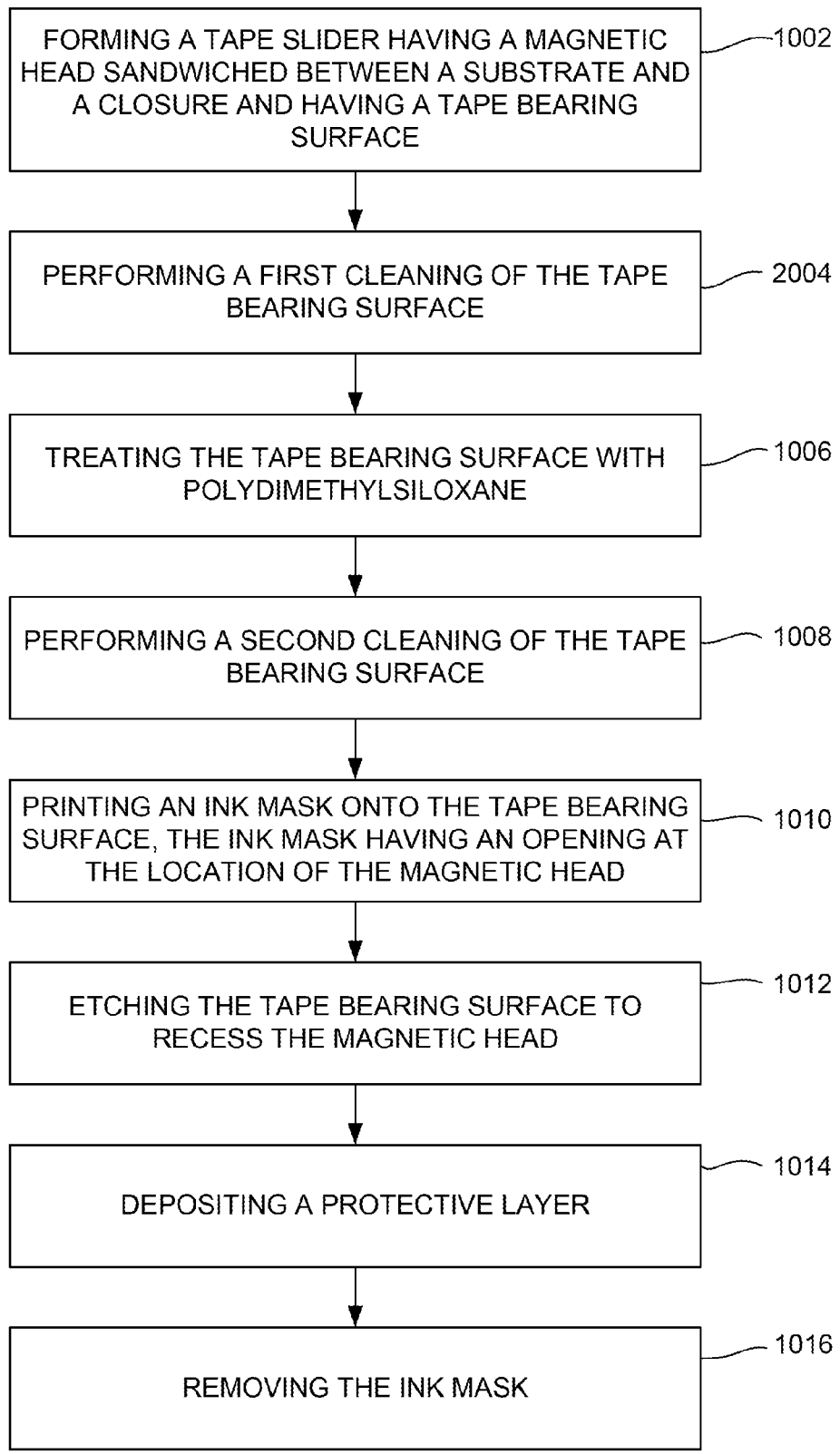
FIG. 10 is a flow chart summarizing a method of manufacturing a magnetic tape head.

FIG. 10 is a flowchart that summarizes the above described process for manufacturing a magnetic row bar for magnetic recording in a tape drive system. First, in a step 1002, a tape slider (i.e. row bar) is formed having a magnetic head sandwiched between a substrate and a closure and having a tape bearing surface. Then, in a step 1004, a first cleaning is performed by wiping the tape bearing surface with ethanol. This can be accomplished by wiping the tape bearing surface with a linen free cloth that has been wetted with ethanol. Then, in a step 1006, the tape bearing surface is treated with polydimethosilozane. Again, this can be accomplished by wiping the tape bearing surface with a linen free cloth that has been wetted with polydimethosilozane. In a step 1008, a second ethanol cleaning is performed. Again, this can be accomplished by wiping the tape bearing surface with a linen free cloth that has been wetted with ethanol.

Then, in a step 1010, an ink mask is printed onto the tape bearing surface so as to form a mask having an opening at the location of the magnetic head. The printing can be performed using a printer such as a DIMATIX® printer. An etching can then be performed in a step 1012 to recess the magnetic head exposed through the opening in the ink mask. Then, in a step 1014 a protective layer is deposited. The protective layer can be alumina ($Al_2O_3$) and can be deposited by sputter deposition, atomic layer deposition or chemical vapor deposition. Finally, in a step 1016 the ink mask can be removed leaving a protective coating only in a recessed region at the location of the write head. This advantageously provides protection for the magnetic head while not increasing magnetic spacing.

While various embodiments have been described above, it should be understood that they have been presented by way of example only and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A method for manufacturing an apparatus for magnetic data recording, comprising:
   forming a row bar having a tape bearing surface and having a magnetic transducer formed therein;
   applying a first application of ethanol to the tape bearing surface;
   applying polydimethylsiloxane to the tape bearing surface;
   applying a second application of ethanol to the tape bearing surface; and
   printing an ink mask onto the tape bearing surface.

2. The method as in claim 1, wherein the application of polydimethylsiloxane is performed after the first application of ethanol and before the second application of ethanol.

3. The method as in claim 1, wherein the ink mask is has an opening located over the magnetic transducer.

4. The method as in claim 3, further comprising after printing the ink mask, depositing a protective coating.

5. The method as in claim 4 wherein the protective coating comprises alumina.

6. The method as in claim 3 further comprising, after prinking the ink mask, performing an etching to recess the magnetic transducer and then depositing a protective coating.

7. The method as in claim 6 wherein the protective coating comprises alumina.

8. The method as in claim 6 further comprising, after depositing the protective coating, removing the ink mask.

9. The method as in claim 1, wherein the ink mask is printed with a plurality of layers.

10. The method as in claim 1, wherein the first application of ethanol, application of polydimethylsiloxane, and second application of ethanol are applied by wiping with a wetted, linen free cloth.

* * * * *